US009087192B2

(12) United States Patent
Meyer

(10) Patent No.: US 9,087,192 B2
(45) Date of Patent: Jul. 21, 2015

(54) ELECTRONIC CIRCUIT AND METHOD FOR MONITORING A DATA PROCESSING

(71) Applicant: Infineon Technologies AG, Neubiberg (DE)

(72) Inventor: Bernd Meyer, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 14/022,313

(22) Filed: Sep. 10, 2013

(65) Prior Publication Data

US 2015/0074422 A1 Mar. 12, 2015

(51) Int. Cl.
*H04L 9/32* (2006.01)
*H04K 1/00* (2006.01)
*G06F 21/55* (2013.01)
*H04L 9/30* (2006.01)

(52) U.S. Cl.
CPC .............. *G06F 21/55* (2013.01); *H04L 9/3066* (2013.01)

(58) Field of Classification Search
CPC ...... H04L 63/08; H04L 63/10; H04L 63/1619
USPC ......................................... 713/153, 155, 189
See application file for complete search history.

(56) References Cited

U.S. PATENT DOCUMENTS 5,991,415 A 11/1999 Shamir
7,774,160 B2 8/2010 Braun et al.
2002/0091636 A1* 7/2002 Carroll Bullard ............... 705/40
2002/0169971 A1* 11/2002 Asano et al. .................. 713/193
2005/0235154 A1* 10/2005 Serret-Avila ................. 713/176

FOREIGN PATENT DOCUMENTS

DE 102006002891 A1 8/2007

OTHER PUBLICATIONS

"Tutorial: Checksum and CRC Data Integrity Techniques for Aviation"—Koopman et al, Carnegie Mellon Univ., May 2012 http://users.ece.cmu.edu/~koopman/pubs/KoopmanCRCWebinar9May2012.pdf.*

Dan Boneh, Richard A. Demillo, Richard J. Lipton: On the Importance of Checking Cryptographic Protocols for Faults, Lecture Notes in Computer Science, Advances in Cryptology, Proceedings of EUROCRYPT'97, 1997.

Ingrid Biehl, Bernd Meyer, Volker Müller: Differential Fault Attacks on Elliptic Curve Cryptosystems. Lecture Notes in Computer Science, Advances in Cryptology, Proceedings of CRYPTO 2000: pp. 131-146.

(Continued)

*Primary Examiner* — Randy Scott

(57) ABSTRACT

According to one embodiment, an electronic circuit is described comprising a processing circuit configured to perform a data processing including a plurality of successive operations, wherein in at least some of the plurality of operations, a predetermined input value is processed; a check value memory; a controller configured to check, for each operation of the data processing performed by the processing circuit, whether the predetermined input value is processed in the operation, and, if the predetermined input value is processed in the operation, combine the predetermined input value to the content of the check value memory and a detector configured to check, when the processing is complete, whether the content of the check value memory is equal to a predetermined value.

15 Claims, 3 Drawing Sheets

100
Processing circuit 101
Check value memory 102
Controller 103
Detector 104

(56) References Cited

OTHER PUBLICATIONS

Christian Aumueller, Peter Bier, Wieland Fischer, Peter Hofreiter, Jean-Pierre Seifert: Fault Attacks on RSA with CRT: Concrete Results and Practical Countermeasures. Cryptographic Hardware and Embedded Systems—CHES 2002, 4th International Workshop, Redwood Shores, CA, USA, Aug. 13-15, 2002, Revised Papers. Lecture Notes in Computer Science 2523, Springer 2003.

Johannes Bloemer, Martin Otto, Jean-Pierre Seifert: A new CRT-RSA algorithm secure against Bellcore attacks. ACM Conference on Computer and Communications Security 2003.

Johannes Bloemer, Martin Otto, Jean-Pierre Seifert: Sign Change Fault Attacks on Elliptic Curve Cryptosystems. Fault Diagnosis and Tolerance in Cryptography, Third International Workshop, FDTC 2006, Yokohama, Japan, Oct. 10, 2006, Proceedings. Lecture Notes in Computer Science 4236 Springer 2006.

* cited by examiner

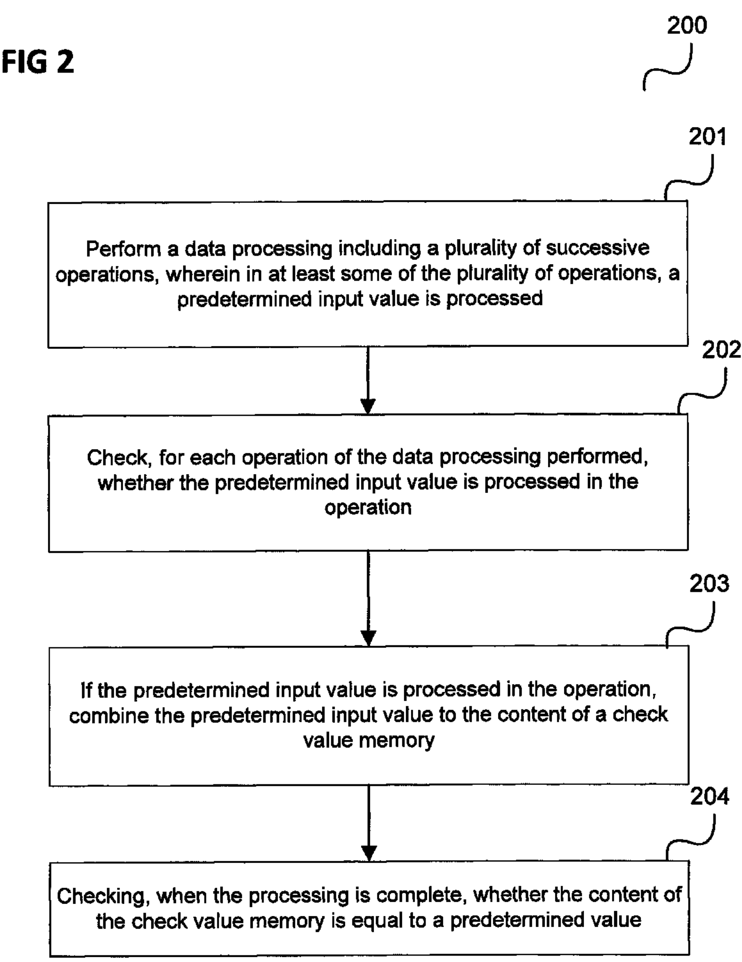
FIG 2
200
201
Perform a data processing including a plurality of successive operations, wherein in at least some of the plurality of operations, a predetermined input value is processed
202
Check, for each operation of the data processing performed, whether the predetermined input value is processed in the operation
203
If the predetermined input value is processed in the operation, combine the predetermined input value to the content of a check value memory
204
Checking, when the processing is complete, whether the content of the check value memory is equal to a predetermined value

ELECTRONIC CIRCUIT AND METHOD FOR MONITORING A DATA PROCESSING

TECHNICAL FIELD

The present disclosure relates to electronic circuits and methods for monitoring a data processing.

BACKGROUND

Error attacks are a form of side channel attacks in which an attacker tries to disturb hardware which performs a data processing (e.g. performs a certain software program or a certain application) by means of external effects to change the normal processing flow and provoke a misbehavior of the hardware. The correct operation of hardware, e.g. an electronic circuit, is typically only guaranteed by a manufacturer for certain environmental conditions and operational parameters. For example, an operation of a hardware outside the specified operation voltage, operation temperature and clock frequency or usage of electromagnetic radiation (such as microwaves, light or laser pulses or x-ray radiation) or radioactive radiation may therefore lead to misbehavior and thus for computation errors. Protection against such computation errors is typically important for security relevant electronic circuits, such as processing circuits on chip cards, since in certain cryptographic methods a single erroneous result may be sufficient to extract secret keys which are under normal operation securely stored in hardware and thus to compromise a whole cryptographic system.

In addition to the classification based on the physical attack technique used error attacks as described above are classified into invasive and non-invasive techniques, methods with transient or permanent errors and attacks on stored data of intermediate results or attacks on the control flow.

Approaches to avoid or detect error attacks are desirable.

SUMMARY

According to one embodiment, an electronic circuit is provided including a processing circuit configured to perform a data processing including a plurality of successive operations, wherein in at least some of the plurality of operations, a predetermined input value is processed; a check value memory; a controller configured to check, for each operation of the data processing performed by the processing circuit, whether the predetermined input value is processed in the operation, and, if the predetermined input value is processed in the operation, combine the predetermined input value to the content of the check value memory and a detector configured to check, when the processing is complete, whether the content of the check value memory is equal to a predetermined value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 2 shows a flow diagram.

DESCRIPTION

Figure 1:
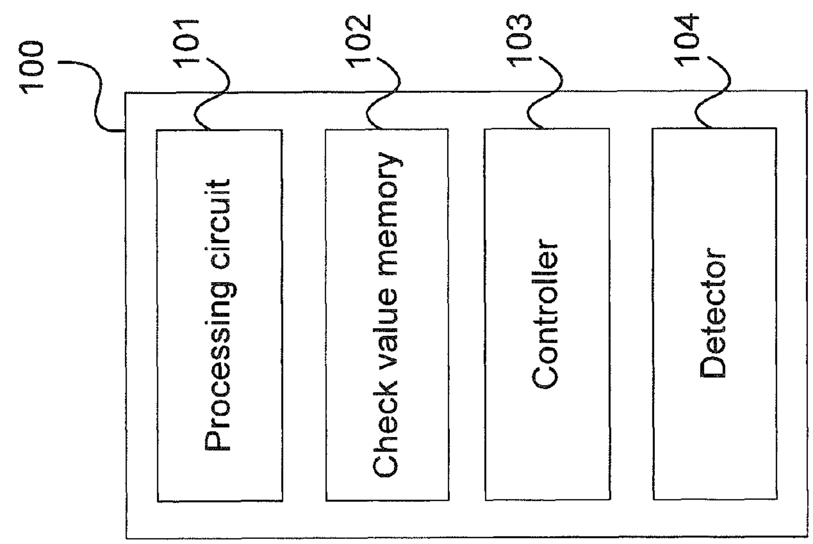
FIG. 1 shows an electronic circuit.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Protection measures in hardware and software to protect against attacks when a computer program is performed typically have the common feature that redundancy in either the computer program or the stored data that is processed by the computer program is inserted and tested or that the preservation of loop invariants of intermediate results of the computer program are verified during the execution of the computer program.

Consistency of stored data can be ensured by means of error-detecting or error-correcting codes, for example Reed-Solomon and CRC codes. In computer systems memory and communication interface typically already contain hardware modules for automatic error detection and error correction. Error detection for cryptographically encrypted data is facilitated by that a slight change of encrypted stored or transmitted data typically leads to a major change of the corresponding plaintext (i.e. the decrypted data). This is because encryption typically has the effect of multiplying errors.

In a system where security is of high importance, such as an on-board system of an aircraft, the complete hardware of the system may be replicated. The resulting plurality of systems may then operate independently of each other and a test unit ensures that the calculated results determined by the systems are identical. In addition to the redundancy a diversification may be achieved in this way. The various redundant (computer) systems may be based on different hardware architectures and the hardware and the software running on them may be developed by teams working independently. Thus, systematic errors in the hardware or software of the redundant systems which would come into effect at the same time and could therefore can be detected by comparing the calculation results of the systems.

A chip in a modern security product such as a chip card may include a plurality of chip sensors distributed over the chip which may on the one hand protect against invasive attacks such as probing by needling and on the other hand may ensure the compliance with the correct environmental conditions for the operation of the chip, such as operation temperature, operation voltage, frequency stability, absence of light and laser flashes etc.

In order to avoid erroneous results, calculations may in some applications be (at least partially) repeated and it may be checked whether the various results are equal. This approach reduces the efficiency of the calculations. To achieve higher efficiency, protection methods may use invariants of the calculated results and intermediate results. For this, the fact is exploited that in many algorithms there are certain relations between the calculated values. For example, the sum or the product of several intermediate results may be constant or fulfill a certain mathematical formula. When there is an error during the calculation such relations are in general no longer fulfilled and the error can thus be detected. In a variant of this approach, an algorithm may be implemented in such a way that disturbing the execution leads to a random result which is without use for the attacker.

The countermeasure (i.e. the protection method) which makes sense and which leads to a sufficient protection level for a specific application typically depends on the used error model. This means it depends on the kind of errors an attacker can induce and the accuracy with which the attacker can induce errors (in the sense of the time of the error with respect to the operations carried out as well as in a spatial sense in terms of memory bits or the control logic attacked).

In the techniques described above the detection of an error in a computer program execution is detected only indirectly by checking of redundant information in the stored data (either through error-detecting and correcting codes, or about the relations between results). However, modern attack methods, for example by means of laser flashes, allow temporally and spatially precisely adjusting the attack, such that during an attack it cannot be assured that protection sensors of a chip react and, for example, the execution of individual instructions of a microcontroller can be disrupted or prevented. Such attack methods allow changing the control flow of an executed program. For example, single jump commands or subroutine calls can be prevented. A possible attack scenario is for example to deliberately override routines for testing for verification of invariants or redundancy of data stored. Another possibility for an attack which may be accurately aligned is to cause subtle changes in calculated intermediate results that may result in that the calculated results are erroneous but such that invariants such as described above remain unchanged. For example, an attacker may achieve that in a particular calculation step an addition of numbers is changed in a subtraction. Such an attack may under certain circumstances not be securely detectable with the approaches described above.

According to one embodiment, an approach is provided which allows, e.g. with an extension of an authentication circuit, monitoring the control flow of a computation as well as the integrity of stored data (such as data stored in a non-volatile memory, e.g. elliptic curve parameters for an cryptographic algorithm). The states of a computation may be modeled by means of a finite state machine. The control flow of the computation is in this case the sequence of states of the finite state machine and checking whether the control flow is correct during execution of the computation means checking whether the correct transitions between the states of the finite state machine are carried out and/or whether the finite state machine goes through the correct sequence of states.

This allows protecting against error attacks having the goal to disturb the execution of loops, jumps or subroutine calls or, for example, to weaken the cryptographic strength of a used elliptic curve by means of fake system parameters. In combination with existing methods for protection against error attacks in calculations performed, a high level of protection may be achieved.

FIG. 1 shows an electronic circuit 100.

The electronic circuit 100 includes a processing circuit 101 configured to perform a data processing including a plurality of successive operations, wherein in at least some of the plurality of operations, a predetermined input value is processed.

The electronic circuit 100 further includes a check value memory 102 and a controller 103 configured to check, for each operation of the data processing performed by the processing circuit 101, whether the predetermined input value is processed in the operation, and, if the predetermined input value is processed in the operation, combine the predetermined input value to the content of the check value memory.

The electronic circuit 100 further includes a detector 104 configured to check, when the processing is complete, whether the content of the check value memory is equal to a predetermined value.

According to one embodiment, in other words, an input value that is processed in a data processing (e.g. in course of a computer program performing a calculation for a cryptographic operation) is, in parallel to the processing, fed into a check value memory and used to update the value stored in the check value memory. For example, for at least some of the operations that use the input value, the input value is fed into the check value memory and combined with the content of the check value memory in a predetermined way. The check value memory may be further changed during the execution of the program flow (e.g. from operation to operation) such that the content of the check value memory does not only depend on whether the input value has been processed by an operation (and thus whether it is fed into the check value memory, i.e. combined to the content of the check value memory) but also when this happens. Thus, the content of the check value memory at the end of the data processing represents the input value and the control flow of the computer program that has been executed and it can be checked whether the input value and the control flow has been correct.

According to one embodiment, combining the predetermined input value to the content of the check value memory includes combining the predetermined input value with the content of the check value memory to generate an updated content of the check value memory and storing the updated content of the check value memory in the check value memory.

The detector may be further configured to decide based on whether the content of the check value memory is equal to a predetermined target value whether processing of data was correctly performed.

For example, the predetermined target value is a value determined based on the predetermined input value.

According to one embodiment, the predetermined input value is constant for the plurality of successive operations.

According to one embodiment, the check value memory is a shift register.

The content of the shift register is for example shifted for at least some of the operations of the plurality of operations.

For example, the content of the shift register is shifted for each operation of the plurality of operations.

According to one embodiment, the data processing is a data processing for a cryptographic operation and the predetermined input value is a cryptographic parameter.

According to one embodiment, the data processing is a data processing for a cryptographic operation based on an elliptic curve and the predetermined input value is a parameter of the elliptic curve.

The data processing may for example be a data processing for a cryptographic operation based on an elliptic curve and the predetermined input value is for example a coefficient of a polynomial representation of the elliptic curve (e.g. one of coefficients $a_1, \ldots, a_6$ in the elliptic curve representation given below).

For example, the data processing is a sequence of field operations on elements of the field over which the elliptic curve is defined.

The electronic circuit may further include a state machine configured to control the data processing, wherein the controller is configured to combine an information about a state of the state machine when performing an operation to the content of the check value memory for one or more of the operations of the plurality of operations.

For example, the information about the state of the state machine is information representing the state of the state machine (e.g. a function of the state of the state machine).

According to one embodiment, the electronic circuit is an authentication circuit, e.g. arranged on a chip card.

The electronic circuit 100 for example carries out a method as illustrated in FIG. 2.

FIG. 2 shows a flow diagram 200.

The flow diagram 200 illustrates a method for monitoring a data processing.

In 201 a data processing including a plurality of successive operations is performed (or started), wherein in at least some of the plurality of operations, a predetermined input value is processed.

In 202, it is checked for each operation of the data processing performed whether the predetermined input value is processed in the operation.

In 203, if the predetermined input value is processed in the operation, the predetermined input value is combined to the content of a check value memory.

In 204, when the processing is complete, it is checked whether the content of the check value memory is equal to a predetermined value.

It should be noted that embodiments described in context of the electronic circuit 100 are analogously valid for the method as illustrated in FIG. 2 and vice versa.

In the following, an example is described in which the data processing is a multiplication of elements of a finite field for an cryptographic operation based on an elliptic curve over the finite field.

Elliptic curves over finite fields form the mathematical basis for important schemes of modern public key cryptography such as signature schemes. An elliptic curve is defined by a cubic equation which is generally of the following form:

$$E: y^2 + a_1xy + a_3y = x^3 + a_2x^2 + a_4x + a_6$$

The coefficients $a_1, \ldots, a_6$ are elements of a (finite) field K.

The points of the elliptic curve E is the set of all pairs $(x,y) \in K \times K$, which fulfill the above equation for E and in addition a formal point representing the neutral element. The elliptic curve is said to be a curve over K (or defined over K). The coordinate pair (x, y) of a point P of the elliptic curve is called the affine representation of the point P.

A finite field is a mathematical structure including a finite set of elements and four operations which are typical called addition, subtraction, multiplication and division wherein the arithmetical rules of the real numbers are formally valid for these operations. Elliptic curves defined over one of the following types of fields are of particular practical importance in cryptography:

- K=GF(p), wherein p is a prime number. The objects (i.e. the field elements) of GF(p) are the integers 0, 1, 2, . . . , p−1. The operations are the modulo addition, modulo subtraction, modulo multiplication and modulo division.
- $K=GF(2^n)$, wherein n is a natural number. The objects (i.e. the field elements) are in this case the binary vectors of length n. The addition is the bit-wise XOR. Subtraction and addition are the same. The multiplication may be implemented by means of shift register operations.

In the embodiment described in the following, it is assumed that an elliptic curve is defined over the finite field $GF(2^n)$, e.g. by an equation $$E: y^2 + a_1xy + a_3y = x^3 + a_2x^2 + a_4x + a_6$$

with $a_1, \ldots, a_6$ being elliptic curve parameters which are elements of $GF(2^n)$. In the following, a circuit is described for performing cryptographic operations based on the elliptic curve defined by E.

Figure 3:
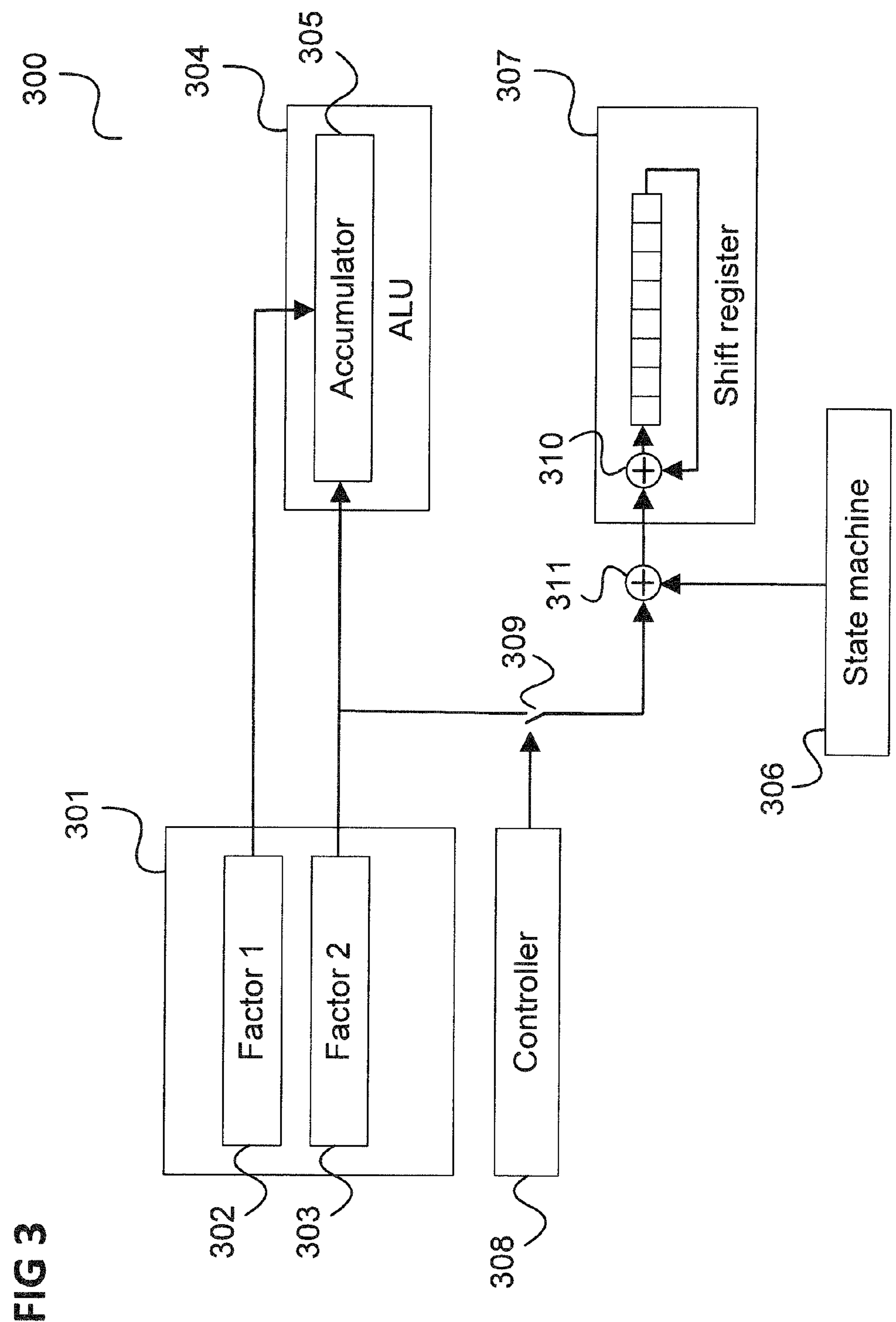
FIG. 3 shows an electronic circuit for performing elliptic curve operations.

FIG. 3 shows an electronic circuit 300.

The electronic circuit 300 is for example an ECC (Elliptic Curve Cryptography) unit for performing elliptic curve operations and is for example part of an authentication IC (integrated circuit) that performs authentication processing.

The electronic circuit 300 includes a register file 301 which includes a plurality of registers, in this example a first register 302 and a second register 303, but may include more registers. Each register 302, 303 of the register file 301 has a length of n Bit.

The electronic circuit 300 further includes an ALU (algorithmic logic unit) 304 with an accumulator 305 with a length of n Bit which for example allows bitwise shifting of its content (optionally with a reduction modulo an irreducible polynomial) and allows parallel addition of the content of a register 302, 303 to the content of the accumulator 305.

The electronic circuit 300 further includes a finite state machine 306 which controls the operation of the register file 301 and the ALU 304 according to, in this example, a scalar multiplication of points of the elliptic curve, for example for performing various tests such as a signature verification.

For this, the finite state machine 306 controls the ALU 304 to carry out a sequence of field operations on elements of the finite field $GF(2^n)$ stored in the registers 302, 303.

In the following, it is assumed that the finite state machine 306 controls the ALU 304 to perform a data processing including a field multiplication in which the ALU 304 processes a first field element (first factor) stored in the first register 302 parallelly (i.e. all bits of the first field element are accessed at the same time and for example in parallel fed to the accumulator 305) and a second field element (second factor) stored in the second register 303 bit-serially (i.e. the bits of the second field element are serially fed to the accumulator 305). It is assumed that for this data processing, the second factor is a constant.

To allow checking the control flow, in other words to ensure that the field multiplication is performed correctly a check value memory in the form of a feedback shift register 307 is included in the electronic circuit 300. The feedback register is in this example a linear feedback shift register (LSFR) but may also be implemented as a non-linear feedback shift register 307. The shift register is for example clocked with the system clock of the state machine 306 (e.g. depending on the transition function of the state machine 306).

The electronic circuit 300 further includes a controller 308 which, for example by controlling a switch 309, initiates that when a bit of the second factor stored in the second register 303 is fed to the accumulator 305, i.e. processed by the ALU 304, this bit is also added to the content of the shift register via an adder 310 of the shift register (in other words via the feedback function of the shift register). In other words, when the second factor is processed in an operation carried out by the ALU 304, the second factor is also (bit-wise) added to the content of the shift register 307. Thus, the second factor may be seen as an example of the predetermined input value described in context with FIG. 1. However, also parts (e.g. only 1 bit) of the predetermined input value may be seen as an example of the predetermined input value. Accordingly, a data processing operation in which the predetermined input value is processed may be a ("larger") data processing operation processing the whole second factor or a ("smaller") data processing operation processing a part (e.g. one bit) of the second factor.

At the beginning of the data processing, e.g. the field multiplication or also a larger part of a cryptographic processing e.g. a plurality of multiplications with different first factors, the shift register 307 may be initialized with a predetermined initial value. In this case, the final value of the sift register 307 at the end of the data processing depends on the number of clock cycles of the finite state machine 306 and the specific bits of the second factor. In particular, the final value depends on the number of times the second factor has been used in multiplications, e.g. in case of a plurality of multiplications of the second factor with different first factors.

Altogether, it can be ensured with some probability that the second factor has not been changed during the data processing (e.g. a scalar multiplication). Further, certain types of errors in the control flow, e.g. whether a loop has been quit too early, may be detected.

At the end of the data processing it may be checked, e.g. by the controller 308, whether the shift register contains the expected (and predetermined) target value that arises when the data processing has been correctly carried out. In case that the shift register does not contain this value at the end of the data processing this can be considered as a sign for an erroneous processing (e.g. caused by an attack) and suitable countermeasures can be taken, e.g. the electronic circuit (or a larger circuit including the electronic circuit) may be reset.

In one embodiment, an information representing the current state of the finite state machine 306 may be added to the content of the shift register 307 at various times by means of a further adder 311, e.g. for each operation performed by the ALU 304. The information may include only one bit or also a plurality of bits which are added to the content of the shift register 307, e.g. together with the bits of the second factor. For example, the transition function of the finite state machine 306 may be extended such that the state machine 306 determines in each state of its states a further bit which is also added to the content of the shift register 307 (e.g. by adding it to the feedback of the shift register 307 by means of the adder 310 of the shift register 307). The value of this bit may for example depend from the field operation that is currently taken out or may be chosen arbitrarily when defining the state machine 306. With this feature, the sequence and order of the states taken by the finite state machine 306 is taken into account in the content of the shift register 307. If the finite state machine 306 deviates from the intended state sequence (e.g. caused by an attack by means of a voltage glitch) there is a high chance that the content of the shift register at the end of the data processing is different from the predetermined target value.

The approach described above allows, at low additional hardware cost, implementing a mechanism for simultaneous checking of the integrity of a state sequence of a finite state machine and the integrity of constant data which are processed bit-serially. From a bit sequence associated with the state sequence and the constant data used during the processing a checksum is determined (in the example above by means of a shift register) and is compared with a predetermined target value.

As explained above, this may for example be used for securing a finite state machine for controlling elliptic curve operations and the integrity of system parameters stored in (e.g. non-volatile) memory, such as curve parameters of the elliptic curve used in an authentication IC. Together with a check of non-constant calculated intermediate results with respect to calculation errors by means of an invariant of the algorithm used (e.g. for scalar multiplication) a high level of protection against error attacks can be achieved.

The shift register may be implemented as primitive feedback register or a non-linear feedback register which generates a sequence a of maximum period length (i.e. a sequence with a period of $2^n-1$ in case of a register length of n). The shift register for example has a length of 32 Bit in the application example described above.

In one embodiment, the bit generated by the transition function of the finite state machine depending on the state of the finite state machine that is added to the content of the shift register may be generated by a function with good autocorrelation characteristics. In this way, small changes in the state sequence of the finite state machine may lead to large changes of the generated bit sequence. This allows reducing the probability that errors in the bit sequence generated by the transition function of the finite state machine cancel themselves within the shift register.

In one embodiment, a read access to the register file 301 by the state machine 306 after the data processing, e.g. for host communication (e.g. communicating the results to another component of the integrated circuit), is only allowed (e.g. by a hardware component) when the shift register has the target value. In this way it can be achieved that intermediate results of the elliptic curve operations and wrong results cannot be read from the register file 301. In one embodiment, in case the state machine (or any other detecting entity) detects an error in the execution or in the calculated results or when the shift register does not reach the target value at the end of the data processing, the state machine carries out a state sequence according to which all security related register contents are deleted and for example sets the shift register after successful execution of the states required for the deletion to the predetermined target value.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. An electronic circuit comprising:

a processing circuit configured to perform a data processing including a plurality of successive operations, wherein in at least some of the plurality of operations, a predetermined input value is processed;

a check value memory;

a controller configured to check, for each operation of the data processing performed by the processing circuit, whether the predetermined input value is processed in the operation, and, if the predetermined input value is processed in the operation, combine the predetermined input value to the content of the check value memory; and a detector configured to check, when the processing is complete, whether the content of the check value memory is equal to a predetermined value;

wherein combining the predetermined input value to the content of the check value memory comprises combining the predetermined input value with the content of the check value memory to generate an updated content of the check value memory and storing the updated content of the check value memory in the check value memory.

2. An electronic circuit comprising:

a processing circuit configured to perform a data processing including a plurality of successive operations, wherein in at least some of the plurality of operations, a predetermined input value is processed;

a check value memory;

a controller configured to check, for each operation of the data processing performed by the processing circuit, whether the predetermined input value is processed in the operation, and, if the predetermined input value is processed in the operation, combine the predetermined input value to the content of the check value memory; and a detector configured to check, when the processing is complete, whether the content of the check value memory is equal to a predetermined value;

wherein the data processing is a data processing for a cryptographic operation based on an elliptic curve and the predetermined input value is a parameter of the elliptic curve.

3. The electronic circuit according to claim 2, wherein the detector is further configured to decide based on whether the content of the check value memory is equal to a predetermined target value whether processing of data was correctly performed.

4. The electronic circuit according to claim 3, wherein the predetermined target value is a value determined based on the predetermined input value.

5. The electronic circuit according to claim 2, wherein the predetermined input value is constant for the plurality of successive operations.

6. The electronic circuit according to claim 2, wherein the data processing is a data processing for a cryptographic operation and the predetermined input value is a cryptographic parameter.

7. The electronic circuit according to claim 2, being an authentication circuit.

8. An electronic circuit comprising:

a processing circuit configured to perform a data processing including a plurality of successive operations, wherein in at least some of the plurality of operations, a predetermined input value is processed;

a check value memory;

a controller configured to check, for each operation of the data processing performed by the processing circuit, whether the predetermined input value is processed in the operation, and, if the predetermined input value is processed in the operation, combine the predetermined input value to the content of the check value memory; and a detector configured to check, when the processing is complete, whether the content of the check value memory is equal to a predetermined value;

wherein the check value memory is a shift register.

9. An electronic circuit comprising:

a processing circuit configured to perform a data processing including a plurality of successive operations, wherein in at least some of the plurality of operations, a predetermined input value is processed;

a check value memory;

a controller configured to check, for each operation of the data processing performed by the processing circuit, whether the predetermined input value is processed in the operation, and, if the predetermined input value is processed in the operation, combine the predetermined input value to the content of the check value memory; and a detector configured to check, when the processing is complete, whether the content of the check value memory is equal to a predetermined value;

wherein the content of the shift register is shifted for at least some of the operations of the plurality of operations.

10. An electronic circuit comprising:

a processing circuit configured to perform a data processing including a plurality of successive operations, wherein in at least some of the plurality of operations, a predetermined input value is processed;

a check value memory;

a controller configured to check, for each operation of the data processing performed by the processing circuit, whether the predetermined input value is processed in the operation, and, if the predetermined input value is processed in the operation, combine the predetermined input value to the content of the check value memory; and a detector configured to check, when the processing is complete, whether the content of the check value memory is equal to a predetermined value;

wherein the content of the shift register is shifted for each operation of the plurality of operations.

11. An electronic circuit comprising:

a processing circuit configured to perform a data processing including a plurality of successive operations, wherein in at least some of the plurality of operations, a predetermined input value is processed;

a check value memory;

a controller configured to check, for each operation of the data processing performed by the processing circuit, whether the predetermined input value is processed in the operation, and, if the predetermined input value is processed in the operation, combine the predetermined input value to the content of the check value memory; and a detector configured to check, when the processing is complete, whether the content of the check value memory is equal to a predetermined value;

wherein the data processing is a data processing for a cryptographic operation based on an elliptic curve and the predetermined input value is a coefficient of a polynomial representation of the elliptic curve.

12. The electronic circuit according to claim 11, wherein the data processing is a sequence of field operations on elements of the field over which the elliptic curve is defined.

13. An electronic circuit comprising:

a processing circuit configured to perform a data processing including a plurality of successive operations, wherein in at least some of the plurality of operations, a predetermined input value is processed;

a check value memory;

a controller configured to check, for each operation of the data processing performed by the processing circuit, whether the predetermined input value is processed in the operation, and, if the predetermined input value is processed in the operation, combine the predetermined input value to the content of the check value memory; and a detector configured to check, when the processing is complete, whether the content of the check value memory is equal to a predetermined value;

further comprising a state machine configured to control the data processing, wherein the controller is configured to combine information about a state of the state machine when performing an operation to the content of the check value memory for one or more of the operations of the plurality of operations.

14. The electronic circuit according to claim 13, wherein the information about the state of the state machine is information representing the state of the state machine.

15. A method for monitoring a data processing:

performing a data processing including a plurality of successive operations, wherein in at least some of the plurality of operations, a predetermined input value is processed, wherein the data processing is a data processing for a cryptographic operation based on an elliptic curve and the predetermined input value is a parameter of the elliptic curve;

checking, for each operation of the data processing performed, whether the predetermined input value is processed in the operation, if the predetermined input value is processed in the operation, combine the predetermined input value to the content of a check value memory; and checking, when the processing is complete, whether the content of the check value memory is equal to a predetermined value.

* * * * *